(12) United States Patent
Habets et al.

(10) Patent No.: US 7,792,360 B2
(45) Date of Patent: Sep. 7, 2010

(54) METHOD, A COMPUTER PROGRAM, AND APPARATUS, AN IMAGE ANALYSIS SYSTEM AND AN IMAGING SYSTEM FOR AN OBJECT MAPPING IN A MULTI-DIMENSIONAL DATASET

(75) Inventors: Raymond Joseph Elisabeth Habets, Eindhoven (NL); Nicolae Suditu, Eindhoven (NL); Steven Lobregt, Eindhoven (NL); Frans Andreas Gerritsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 984 days.

(21) Appl. No.: 11/568,245

(22) PCT Filed: Apr. 21, 2005

(86) PCT No.: PCT/IB2005/051298

§ 371 (c)(1),
(2), (4) Date: Oct. 24, 2006

(87) PCT Pub. No.: WO2005/106793

PCT Pub. Date: Nov. 10, 2005

(65) Prior Publication Data

US 2007/0230782 A1 Oct. 4, 2007

(30) Foreign Application Priority Data

Apr. 28, 2004 (EP) .................................. 04101791

(51) Int. Cl.
*G06K 9/00* (2006.01)
*G06K 9/62* (2006.01)
*G06K 9/46* (2006.01)

(52) U.S. Cl. ...................................... 382/173; 382/209

(58) Field of Classification Search ................. 382/113, 382/128, 154, 164, 173, 181, 197, 199, 203, 382/209, 256, 266, 276–277, 284, 298; 345/424, 345/619–620, 629; 715/235, 274
See application file for complete search history.

(56) References Cited

U.S. PATENT DOCUMENTS 5,559,901 A 9/1996 Lobregt
(Continued)

FOREIGN PATENT DOCUMENTS

WO 9839736 A1 9/1998
(Continued)

OTHER PUBLICATIONS

Meetz, K. et al., "Coupled Deformable Models with Spatially Varying Features for Quantitative Assessment of Left Ventricular function from Cardiac MRI", Proceedings of the SPIE, vol. 5032, Feb. 20, 2003.
(Continued)

*Primary Examiner*—Amir Alavi

(57) ABSTRACT

A method of object mapping in a multi-dimensional dataset, said method comprising using a processor to perform the steps of: segmenting the multi-dimensional dataset using multi-dimensional graphic objects, defining a set of geometric relations between a set of geometric templates using a geometrical relational application framework macro, associating the multi-dimensional graphic objects with the geometric templates, and constructing, for the multi-dimensional graphic objects, constituent models, wherein a constituent model is designated for segmenting a respective predetermined constituent structure, constructing a composite model for segmenting the multi-dimensional graphic dataset by determining at least two constituent structures that are incorporated in or related to the multi-dimensional graphic object, and forming the composite model based on respective constituent models that correspond to the respective determined constituent structures, the composite model being operative to segment the multi-dimensional graphic dataset by controlling the constituent models.

20 Claims, 7 Drawing Sheets

U.S. PATENT DOCUMENTS

| | | | |
|---|---|---|---|
| 6,690,371 | B1 | 2/2004 | Okerlund |
| 6,707,932 | B1 * | 3/2004 | Chakraborty ............... 382/113 |
| 6,906,730 | B2 * | 6/2005 | Bossut et al. ............... 345/629 |
| 7,180,528 | B2 * | 2/2007 | Bossut et al. ............... 345/629 |
| 2005/0125728 | A1 * | 6/2005 | Peiro et al. ................... 715/523 |
| 2006/0285730 | A1 * | 12/2006 | Habets et al. ............... 382/128 |
| 2007/0230782 | A1 * | 10/2007 | Habets et al. ............... 382/173 |

FOREIGN PATENT DOCUMENTS

| | | |
|---|---|---|
| WO | 0063844 A1 | 10/2000 |
| WO | 2004036500 A2 | 4/2004 |

OTHER PUBLICATIONS

McInerney, T. et al., "Deformable Models in Medical Image Analysis: A Survey", Medical Image Analysis vol. 1 No. 2, 1996.

Delingette, H. "General Object Reconstruction based on Simplex Meshes", International Journal of Computer Vision vol. 32, No. 2, 1999.

Gerard, O. et al., "Efficient Model-Based Quantification of Left Ventricular Function in 3-D Echocardiography", IEEE Transactions on Medical Imaging vol. 21, No. 9, Sep. 2002.

Patias, P. "Medical Imaging Challenges Photogrammetry", ISPRS Journal of Photogrammetry and Remote Sensing, vol. 56, 2002.

* cited by examiner (State of the art)

(State of the art)

(State of the art)

METHOD, A COMPUTER PROGRAM, AND APPARATUS, AN IMAGE ANALYSIS SYSTEM AND AN IMAGING SYSTEM FOR AN OBJECT MAPPING IN A MULTI-DIMENSIONAL DATASET

This application is a 371 of PCT/IB05/51298 filed on Apr. 21,2005.

The invention relates to a method of object mapping in a multi-dimensional dataset, said method comprising the steps of carrying out a segmentation of the multi-dimensional dataset using multi-dimensional graphic objects.

The invention further relates to a computer program.

The invention still further relates to an apparatus for enabling an object mapping in a multi-dimensional dataset, said apparatus comprising:
 input means for loading the multi-dimensional dataset;
 a processing means for carrying out a segmentation of said multi-dimensional dataset using multi-dimensional graphic objects.

The invention still further relates to an image analysis system arranged to map a multi-dimensional dataset.

The invention still farther relates to an imaging system.

An embodiment of the method as is set forth in the opening paragraph is known from U.S. Pat. No. 5,559,901. The known method uses deformable two-dimensional or three-dimensional graphic objects which are placed inside the multi-dimensional image data, after which these objects optimize their shape and position automatically according to a pre-defined criterion. For example, if a boundary of an anatomical structure is characterized by a gradient in the voxel values, reshaping of the multi-dimensional graphic object following the maximum gradient locations results in a model of the shape of the anatomical structure. FIG. 1 shows an embodiment of the known deformable two-dimensional object which starts from a simple shape 2 and deforms automatically following a gradient path until it takes the definitive shape 3, representing an object 1 within the multi-dimensional dataset. FIG. 2 shows an embodiment of the known deformable three-dimensional object which starts from a simple shape 2 and deforms automatically 2a', 2a'' following a gradient path until it takes the definitive shape 3, representing an object 1 within the multi-dimensional dataset.

It is a disadvantage of the known method that the known segmentation only provides a model for a contour or a shape of the structure. When one is interested in geometrical properties of the segmented structure an additional data handling step is required.

It is an object of the invention to provide a method of object mapping in the multi-dimensional dataset, wherein information about geometric properties of the segmented structure is extractable automatically from the multi-dimensional dataset.

To this end the method according to the invention comprises the following steps:
 defining a set of geometric relations between a set of geometric templates using a geometrical relational application framework macro;
 associating the multi-dimensional graphic objects with the geometric templates.

The technical measure of the invention is based on the insight that by associating the multi-dimensional graphic objects with a graphic application framework, the accurately positioned, oriented and sized multi-dimensional graphic objects are tailored to the graphic templates and are thus also operable by the graphic application framework macro. This feature ensures not only an accurate segmentation of the multi-dimensional dataset but also the extraction of geometrical properties of the segmented structures automatically using the geometric application framework macro defined for the geometric templates. The term 'associated' within the scope of the present application must be understood as any linking between respective spatial coordinates of the multi-dimensional graphic objects and the spatial coordinates of the graphic template. It must be noted that spatial coordinates can be exact Euclidian coordinates, polar coordinates or coordinates within any suitable coordinate system. Additionally the spatial coordinates of the multi-dimensional graphic object can be functionally related to the coordinates of the associated template, or vice versa. After the segmentation step is realized yielding the multi-dimensional graphic objects and after the geometric template is selected, the respective spatial coordinates may be stored in a suitable look-up table and may be addressed by suitable reconstruction means upon an event either multi-dimensional graphic object or the geometric template were repositioned within the multi-dimensional dataset. Alternatively, in the case when the functional association is used, the suitable reconstruction means carry out a calculation of the new spatial coordinates and update the running spatial coordinates of an associated item when the other associated item is repositioned.

An embodiment of the image handling using the geometric application framework macro is known from WO/0063844, assigned to the present Applicant. The geometric application framework macro is arranged to provide detailed descriptions of the various geometric templates defined within an image, in particular to structurally interrelate said templates within geometry of the image, thus providing a structural handling of various geometrical templates so that a certain pre-defined geometrical consistency between the templates is maintained. The geometric application framework macro further enables analysis and/or measurement of geometrical properties of anatomical structures, when the structure is provided with a suitable landmark. A broad variety of possible geometric relations between pre-definable geometric templates, like a circle, a line, a sphere, etc., is possible and is defined within the geometric application framework macro. The geometric template is operatable by the geometric application framework macro using a landmark, or a set of landmarks associated with the geometric template. FIG. 3 shows an embodiment of the known geometric template controllable by the geometric application framework macro which is arranged to define geometrical relations between the geometric templates 4, 5a, 5b, 6. The known graphic application framework macro is further arranged to maintain the defined geometrical relations once any geometrical template is repositioned. The respective geometrical templates are defined using respective associated landmarks 7a, 7b, 7e, 7f. Next to these landmarks, landmarks 7c and 7d are set by the geometric relational application framework macro.

The geometric relational application framework macro can also be arranged to operate a three-dimensional geometric template (not shown). The known geometric application framework macro has a disadvantage that the landmarks associated with the geometric templates have to be modified manually, which leads to subjective non-reproducible results. For example, in FIG. 3 the landmarks 7a and 7b being indicative to a femur head are to be positioned manually.

The technical measure of the invention has a synergistic effect between the multi-dimensional graphic objects and the graphic relational application macro, it being not only a provision of a fully automated method for image mapping in the multi-dimensional dataset, but also being a provision of a highly reliable delineation and a measurement tool.

In an embodiment of the method, the method comprises the steps of:

correlating an update of a multi-dimensional graphic object with an update of the geometric template.

As a result of this technical measure the updating of the multi-dimensional graphic object when the geometric template is displaced takes place of the manual updating. In case the multi-dimensional graphic object is redefined, the automatic update of the position of the associated graphic template eliminates a necessity of manual adapting. If manual interaction is still desired, the position of the graphic template can be used as an automatic proposal for manual adapting, thus reducing interaction effort. Preferably, a position of a geometric template is arranged to be derivable from the associated automatically positioned multi-dimensional graphic object. For example, a graphic template being a circle can be fitted into a path of the multi-dimensional graphic object. Similarly, a multi-dimensional graphic object can be derived from a geometric template, for example by calculating discrete vertex positions along the path of the graphic template and by re-initializing the multi-dimensional graphic object along the path of the graphic template after each modification of the graphic template has taken place.

In a still further embodiment of the method according to the invention, the geometric relational application framework macro is arranged to define a constraint on an associated multi-dimensional graphic object.

This technical feature is based on the insight that for clinical applications aimed at handling a medical multi-dimensional dataset, it is advantageous to incorporate anatomical knowledge about relative positions and orientations of a collection of anatomical structures into the geometric relational application macro, which is tailored to solve a particular clinical problem or to execute a particular sequence of data analysis steps. The graphic relational application macro is preferably used to initialize a set of multi-dimensional graphic objects. The resulting image mapping is objective and therefore reduces an amount of interactions with a user.

The graphic relational application macro is preferably arranged to impose constraints and relations on the multi-dimensional graphic structure during a deformation thereof. As a result, situations incompatible with clinical expertise are avoided. In addition, the position of the multi-dimensional graphic object is automatically optimized with respect to the information contained in the multi-dimensional dataset, the optimization being translated into objective automatic modification of properties of the geometric templates and positions thereof, thus still further reducing required manual interaction.

In a still further embodiment of the method according to the invention, the method comprises the further steps of:

constructing a constituent model, each constituent model being designated for segmenting a respective predetermined constituent structure;

constructing a composite model for segmenting the multi-dimensional graphic dataset by determining at least two constituent structures that are incorporated in or related to the multi-dimensional graphic object;

forming the composite model based on respective constituent models that correspond to the respective determined constituent structures, the composite model being operative to segment the multi-dimensional graphic dataset by controlling the constituent models.

According to this technical measure, a composite model is arranged to segment a composite structure using constituent models, so that each is arranged to find their most plausible solution in the multi-dimensional dataset (e.g. 2-dimensional image). Each constituent model is designated to segment a constituent structure that is incorporated in or related to the composite structure. With structure an area or object of interest in said dataset is meant, for example a delineation of an organ within a medical dataset. In itself it is not relevant how such a constituent model operates. For example, it can be based on image information itself (how well does the model correspond to the image information), on the likelihood of the solution, or a combination of these. Such behavior can be expressed by minimizing the energy of the model, or—equivalently—by maximizing the likelihood of the solution. A constituent model may be a primitive model developed for segmenting respective primitive structures, such as a left lung, right lung and a heart, solely using a-priori knowledge of the object and without the use/assistance of other models. The primitive models may be combined in one composite model for segmenting the lungs and heart. As such, this composite model identifies a composite structure including or related to the three primitive structures left lung, right lung and the heart. Similarly, several of the same primitive models for segmenting a dorsal vertebra may be combined into a composite model for segmenting a spine. In itself each primitive model may use any suitable segmentation technique to segment the primitive structure for which it is designed. The composite model needs not to be aware of any implementation aspect of the underlying primitive models. It must be noted that a reference to a particular organ is made for illustration purposes only without imposing any limitation to the method according to the invention.

The modular framework according to the present embodiment can be used to implement object segmenters for different applications. The re-use of already developed segmenters will allow rapid progress by building on existing techniques instead of restarting from scratch. The framework also stimulates improvement to existing primitive models, since an improved model can be applied without any effort in any composite model that already used a predecessor of such primitive model, even if the newly developed model is based on different segmentation techniques. Particularly, in medical imaging many objects are quite complex, but can be split up into different parts that are simpler and easier to find. Also, neighboring structures and objects are often easier to find than the object of interest itself, which can help in locating and segmenting that object of interest. In this way, a high quality composite model can be constructed based on existing, and usually simpler, primitive models.

In a still further embodiment of the method according to the invention an interface is provided for enabling and controlling the communication between the multi-dimensional graphic objects and the associated graphic template.

According to this technical measure, the constituent models are provided with an interface for controlling the models. This enables building a framework of models wherein a higher level model (for segmenting a composite structure) is built using constituent models for the constituent structures in the composite structure. Preferably a uniform interface is selected. The interface is preferably arranged to setup and control the associations between the active objects and the relational graphics, for example to define relations and build an application specific controller that controls the update strategy between the active and the relational worlds. Besides this the user can use the interface of the relational graphics to interact with the models. The application designer (and optionally the user) can also access the active object user interface of which the hobbit interface (described below) is one possible example. The uniform interface of the models enables the composite model to control all the constituent models in the same way and thus significantly simplifies building a composite model. Additionally, the uniform interface, by its nature being model-independent, hides the internal working of the models. This makes it much easier to replace a constituent model by a different implementation, e.g. with improved performance, using different segmentation techniques, etc.

The invention further relates to a computer program arranged to enable an object mapping in a multi-dimensional dataset.

In a preferred embodiment of the computer program according to the invention, it is arranged to:
operate a computer code arranged to carry out a segmentation of the multi-dimensional dataset using multi-dimensional graphic objects;
define a set of geometric relations between a set of geometric templates using a geometric application framework macro;
associate the multi-dimensional graphic objects with the geometric templates.

It must be noted that each of the defined operations of the computer program may be realized in a separate executable subroutine, the computer program being arranged to execute said subroutines in a suitable fashion. Alternatively, the computer program according to the invention may comprise in itself all necessary instructions to implement its objective. Those skilled in the art will appreciate that many modifications are possible for the way the computer program is physically realized. It is noted that all modifications falling within the scope of the invention are contemplated.

The invention still further relates to an apparatus for enabling an object mapping in a multi-dimensional dataset, said apparatus comprising:
input means for loading the multi-dimensional dataset;
a processing means for carrying out a segmentation of said multi-dimensional dataset using multi-dimensional graphic objects;
a computation means arranged to define a set of geometric relations between a set of geometric templates using a geometrical relational application framework macro;
means for associating the multi-dimensional graphic objects with the geometric templates.

The invention still further relates to an image analysis system comprising the apparatus for enabling an object mapping in a multi-dimensional dataset and a viewing means arranged to visualize the multi-dimensional objects associated to a geometric template.

The imaging system according to the invention comprising the image analysis system and a data acquisition unit arranged for acquiring the multi-dimensional dataset.

These and other aspects of the invention will be explained in more detail with reference to Figures, wherein like reference signs refer to like items.

Figure 1:
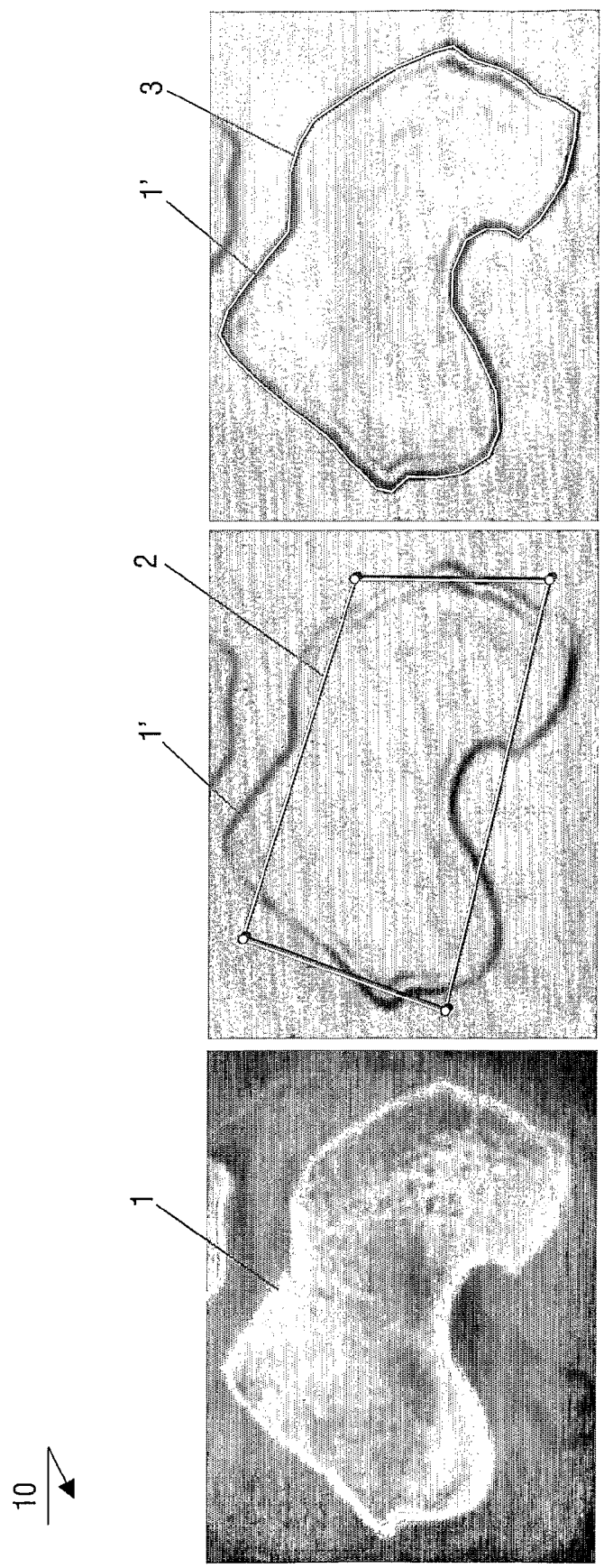
FIG. 1 shows an embodiment of a two-dimensional contour arranged to automatically delineate a structure (state of the art).

FIG. 1 shows an embodiment 10 of a two-dimensional contour arranged to automatically delineate a structure. In this embodiment a structure 1, being a cross-section of a knee, is shown. The two-dimensional contour 2 is positioned over an image comprising gradient information 1' about the structure 1. The two-dimensional contour 2 is arranged to evolve its shape in a known per se way, so that a match between the gradient information 1' and the contour 2 is reached. A plurality of known per se methods operating deformable objects are applicable for this purpose, for example the method known from U.S. Pat. No. 5,559,901.

Figure 2:
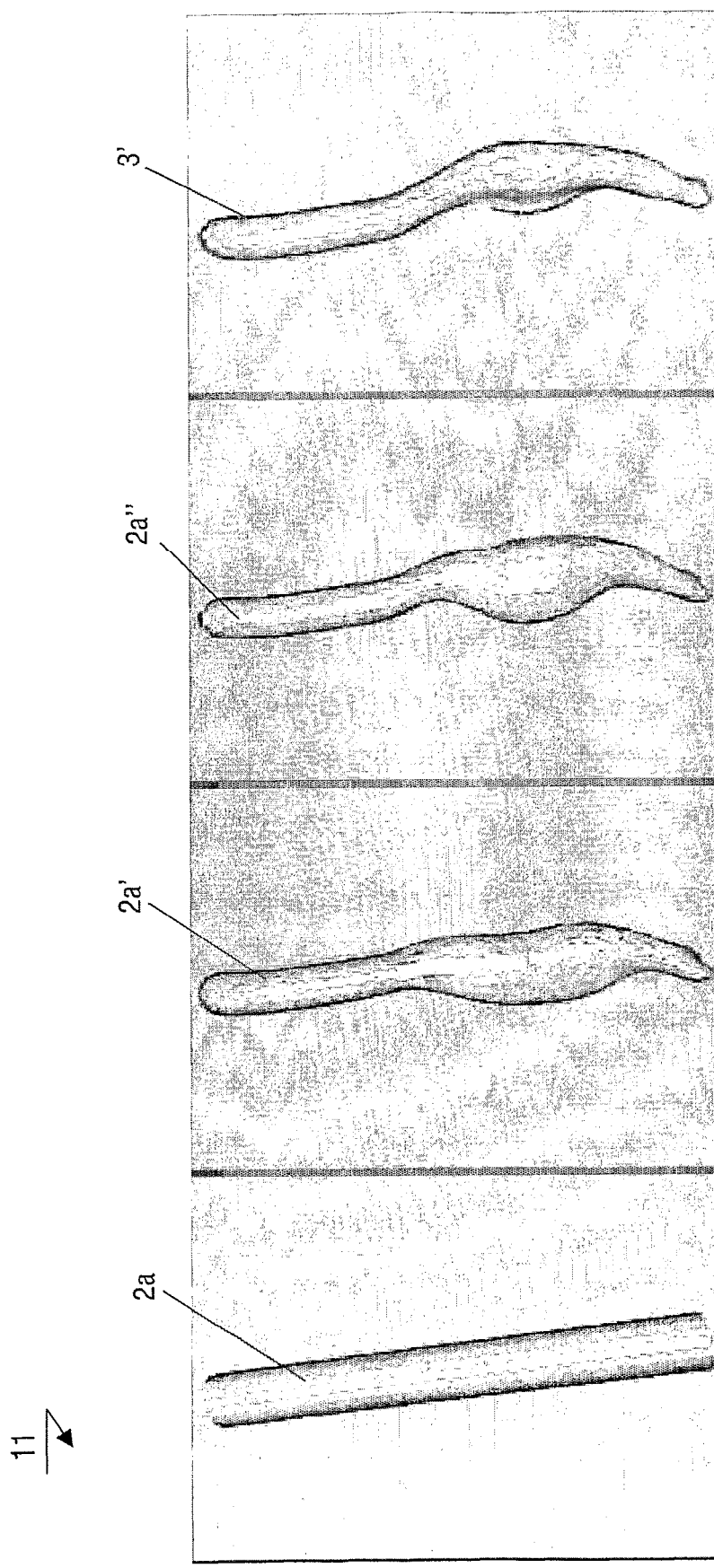
FIG. 2 shows an embodiment of a three-dimensional object arranged to automatically reshape to match a spatial shape of a structure (state of the art).

FIG. 2 shows an embodiment 11 of a three-dimensional object arranged to automatically reshape to match a spatial shape of a structure. In this example a section of a cylinder is shown as a deformable three-dimensional graphic object. Naturally, other shapes can be used as well. The cylindrical three-dimensional graphic object 2a is preferable for mapping a section of a vasculature. Various pieces of vasculature can be thus successfully mapped. In addition, the cylindrical three-dimensional graphic object 2a is suitable for mapping an aneurism. Usually, the deformable three-dimensional graphic object 2a undergoes a number of deformations 2a', 2a'', before a match 3' is reached.

Figure 3:
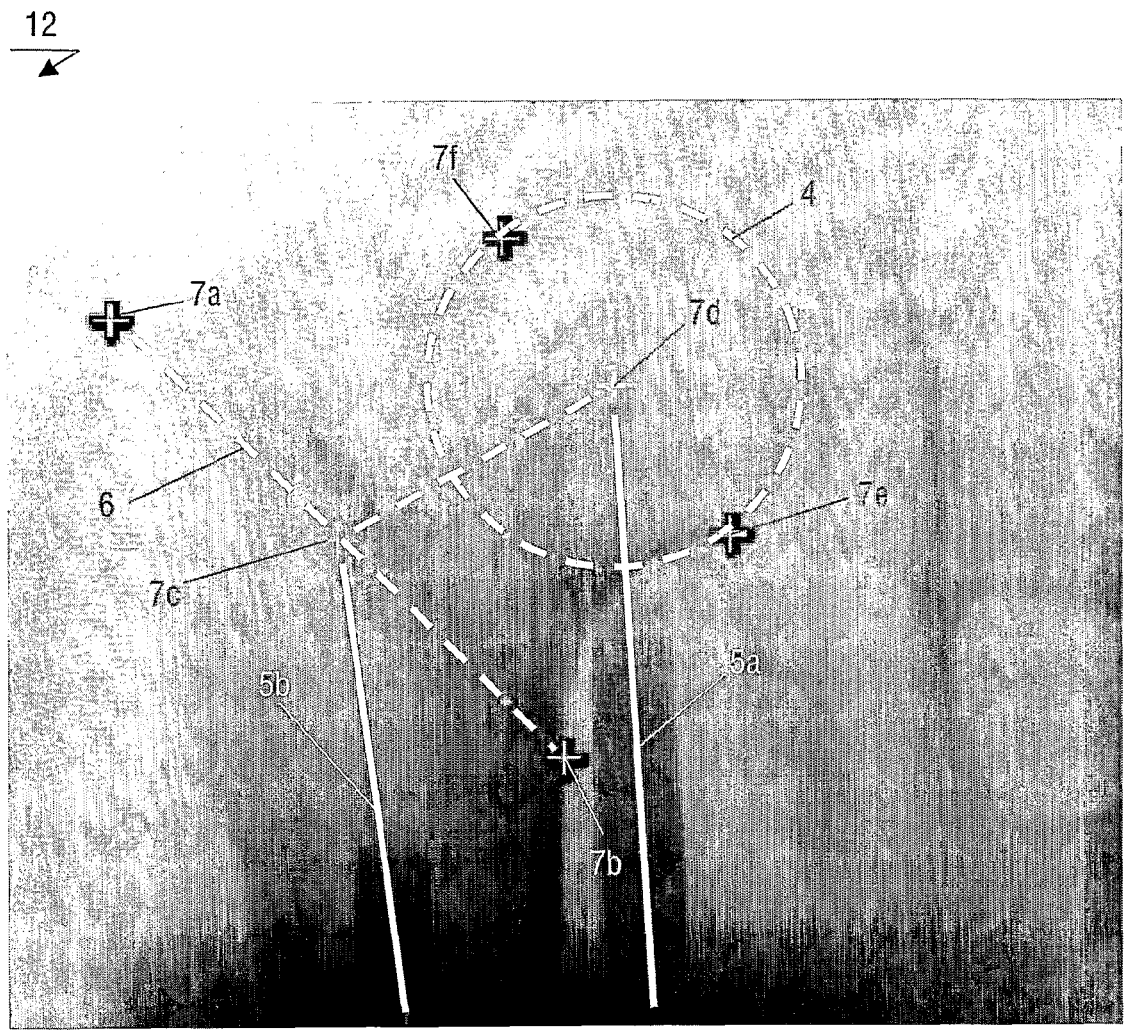
FIG. 3 shows an embodiment of a two-dimensional graphic relational application macro (state of the art).

FIG. 3 shows an embodiment of a known two-dimensional graphic relational application macro 12, which is arranged to define geometrical relations between the geometric templates 4, 5a, 5b, 6. The known graphic application framework macro is further arranged to maintain the defined geometrical relations once any geometrical template is repositioned. The respective geometrical templates are defined using respective associated landmarks 7a, 7b, 7e, 7f. The geometric application framework macro can also be arranged to operate a three-dimensional geometric template (not shown).

Figure 4:
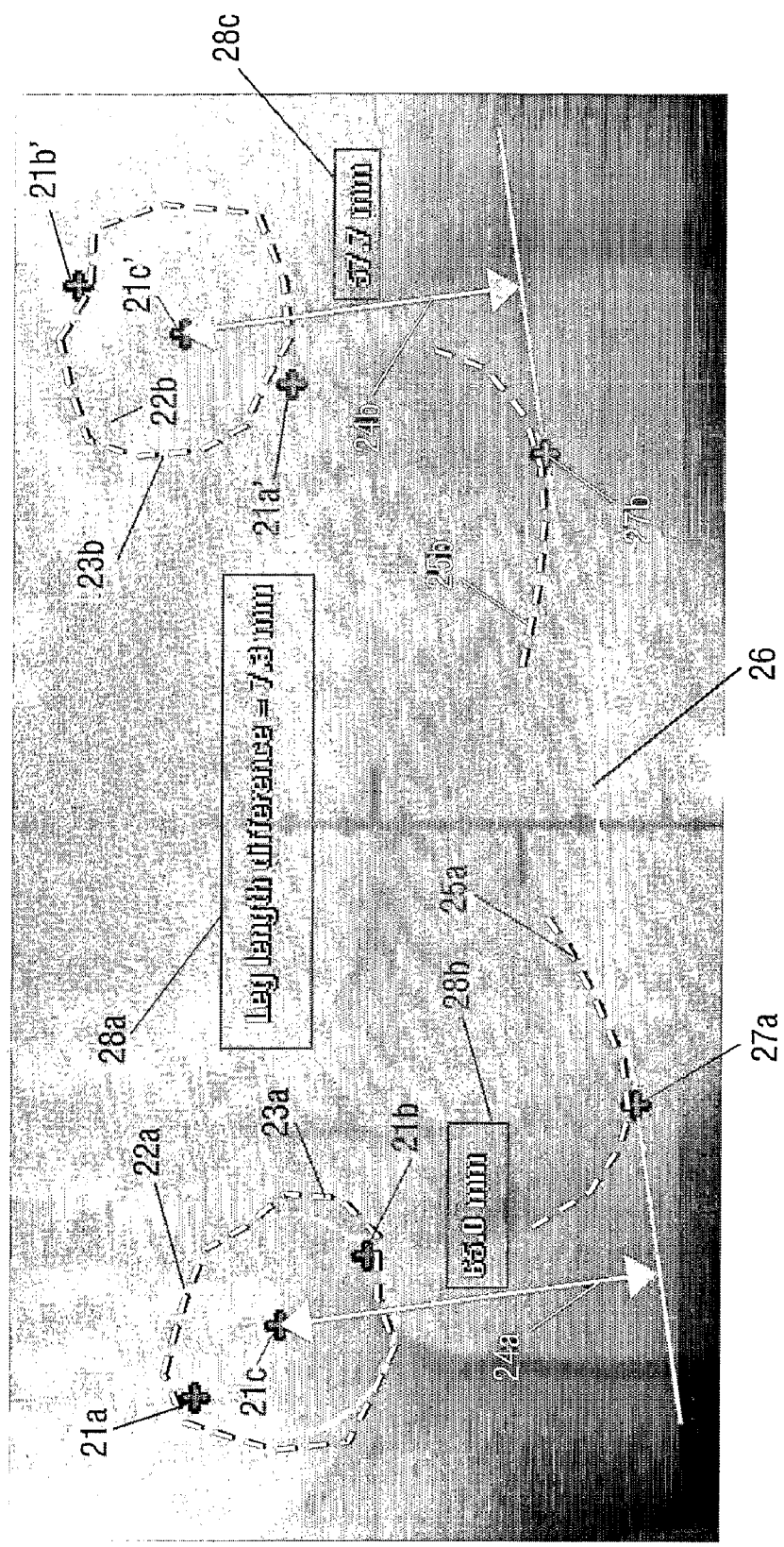
FIG. 4 shows a first embodiment of an application of a multi-dimensional graphic object associated with a geometric template according to the invention.

FIG. 4 shows a first embodiment of an application 20 of a multi-dimensional graphic object associated with a geometric template according to the invention. This particular embodiment illustrates the application related to a measurement of a leg length difference based on an X-ray image. Any other suitable image from any other suitable imaging modality may as well be used for practicing the invention. The graphic templates inter-related by the graphic relational application macro comprise two circles 22a, 22b arranged for modeling of size and position of corresponding femoral heads, and a line 26 arranged for indicating the base of the pelvis. Distances from both circle centers 21c, 21c' to this baseline are also part of the geometric relational application macro structure and are calculated automatically. Therefore, the difference between the distances 24a, 24b representing the leg length difference is also obtained automatically with high precision.

If one element (circle 22a or line 26) is modified all other elements are automatically updated to reflect this modification. According to the invention, multi-dimensional graphic objects 23a, 23b, 25a, 25b are associated with respective graphic templates 22a, 22b, 26. These multi-dimensional graphic objects are arranged to position themselves automatically along edges or other features of the multi-dimensional image dataset. Through specifically defined relations between geometric templates 22a, 22b, 26 inter-related by the graphic relational application macro and the multi-dimensional graphic objects 23a, 23b, 25a, 25b, the positions and dimensions of the graphic templates are again automatically adapted to those of the multi-dimensional graphic objects: the circles 22a, 22b are positioned to fit optimally to the paths of the closed contours 23a, 23b, while the straight line 26 is positioned such that it touches both open contours 25a, 25b. The geometric templates are coupled, so adaptations of the circles 22a, 22b or the straight line 26 are automatically reflected in the measured distances 24a, 24b. Preferably, the constraints and relations that exist between the geometric objects are arranged to limit the adaptation of these objects, which is in turn automatically translated into limitations for the adaptation of the multi-dimensional graphic objects.

Figure 5:
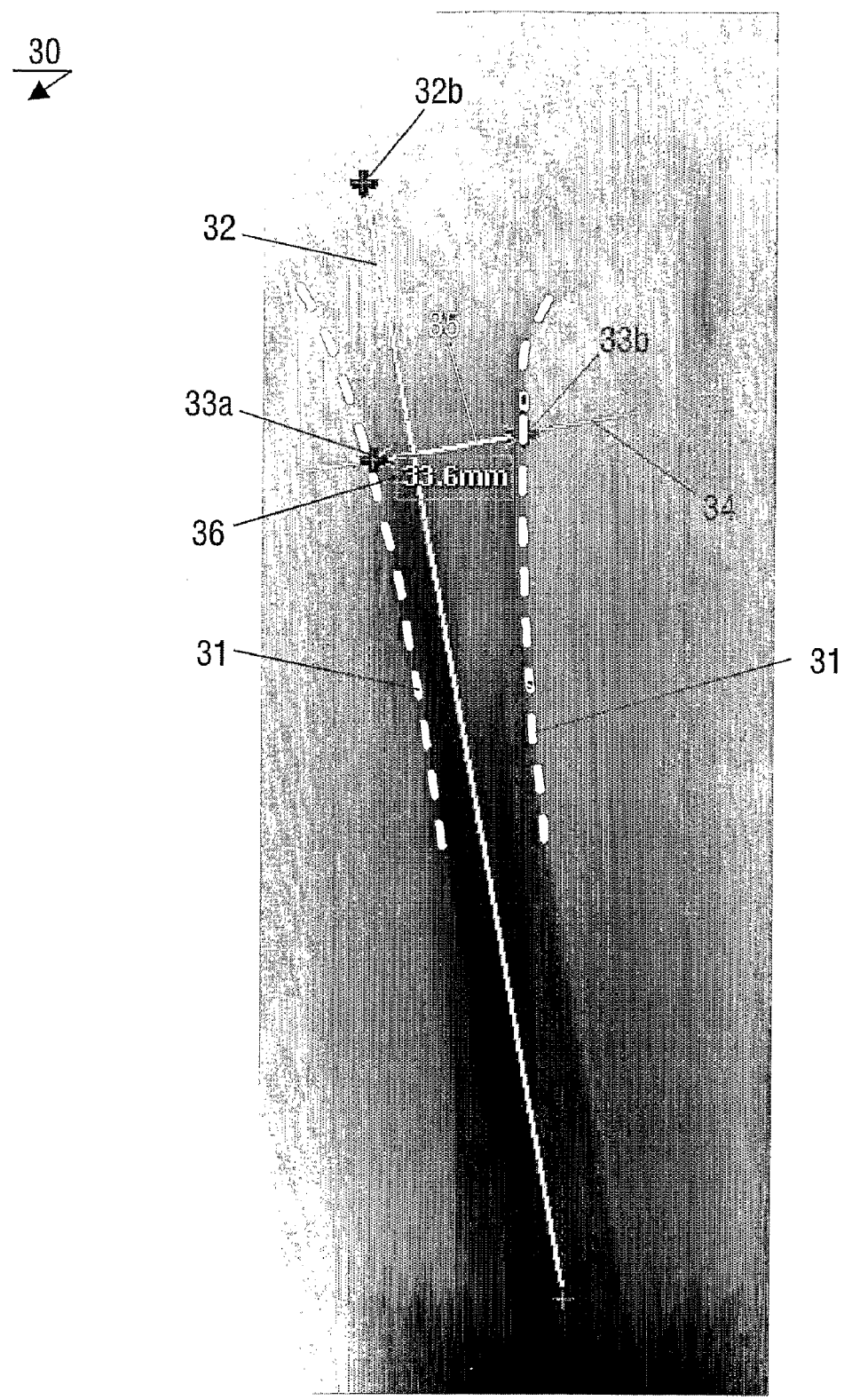
FIG. 5 shows a second embodiment of an application of a multi-dimensional graphic object associated with a geometric template according to the invention.

FIG. 5 shows a second embodiment of an application 30 multi-dimensional graphic object associated with a geometric template according to the invention. FIG. 5 shows an automatic diameter measurement of the femur. The solid lines 32, 34 represent geometric templates: a line 32 modeling the femoral axis, a second perpendicular line 34 modeling a direction of a diameter measurement 35. This perpendicular line 34 is arranged to contains two geometric templates, namely two point objects 33a, 33b with an associated distance measurement, all being defined within the geometric relational application macro. According to the invention, open contours being the multi-dimensional graphic objects 31 are associated with the points 33a, 33b. These contours position themselves automatically along the edges of the femoral bone. Through specifically defined relations between the geometric templates of the geometric relational application macro and the multi-dimensional graphic objects 31, the positions of the two point objects 33a, 33b are automatically adapted to the intersection of the perpendicular line 34 and each multi-dimensional graphic object 31.

In case the user picks up the perpendicular line 34 and moves it along the femoral axis, the diameter measurement 35 will adapt dependent on the current femur diameter at a new location of the perpendicular line 34. In an alternative implementation, the multi-dimensional graphic object can be integrated into a geometric template. In this example an active geometrical relational application macro block is implemented that has a switch that controls a suitable active function, for example to find a positive or negative gradient (edges). The input for this block is the perpendicular line 34 and the multi-dimensional dataset. If this line changes its position within the multi-dimensional dataset, the block updates by executing one update cycle of the multi-dimensional graphic object 31.

Figure 6:
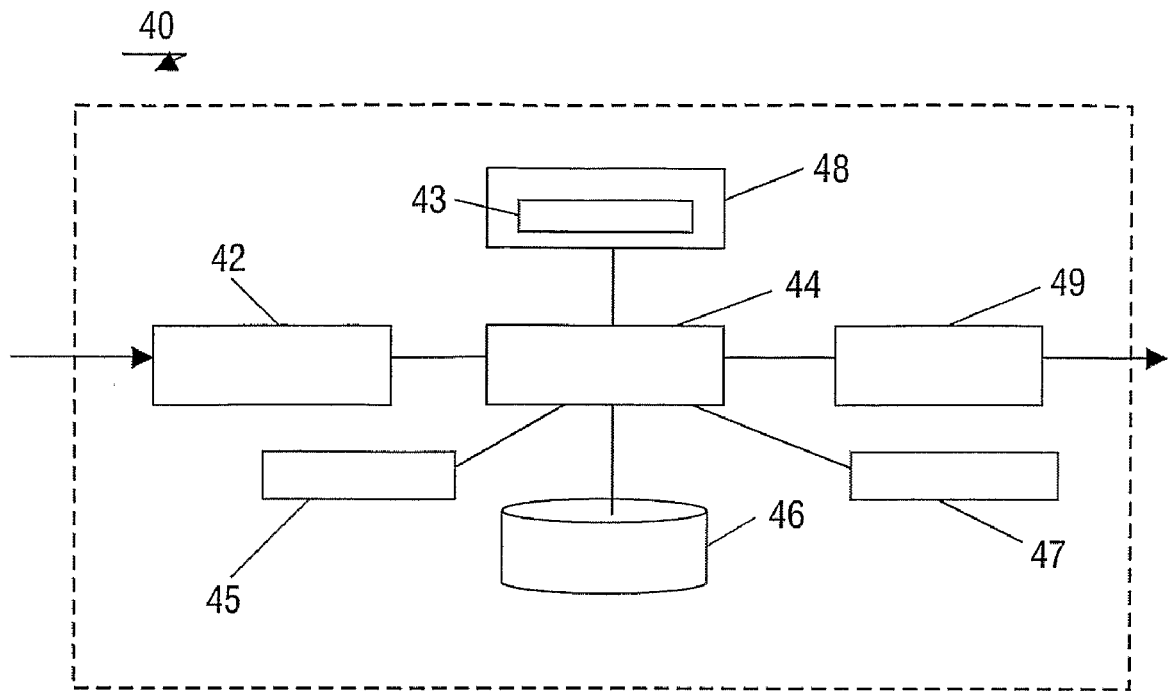
FIG. 6 shows in a schematic way an embodiment of an apparatus according to the invention.

FIG. 6 shows in a schematic way an embodiment of an apparatus according to the invention. The apparatus 40 has an input 42 for receiving the multi-dimensional dataset in any suitable form. For example, the apparatus 40 may be involved in the acquisition of the multi-dimensional dataset. In this case said dataset may be acquired in an analogue form and converted using a suitable A/D converter to a digital form for further processing. The dataset may also be received in a digital form, e.g. through direct acquisition in a digital form or via a computer network after having been acquired by another computer/medical instrument. The core of the apparatus is formed by a processor 44, such as a conventional microprocessor or signal processor, a background storage 48 (typically based on a hard disk) and working memory 46 (typically based on RAM). The background storage 48 can be used for storing the dataset (or parts of it) when not being processed, and for storing operations of the graphic relational application macro and models (when not being executed by the processor). The main memory 46 typically holds the (parts of) the dataset being processed and the instructions of the graphic relational application macro and the models used for processing those parts of the dataset. The apparatus 40 according to the invention comprises computation means 45 arranged to define a set of geometric relations between a set of geometric templates using a geometrical relational application framework macro and means 47 for associating the multi-dimensional graphic objects with the geometric templates. Preferably, means 45 and 47 are operable by a computer program 43, preferably stored in memory 48. An output 49 is used for outputting the result of the mapping. For example, if the processor 44 has been loaded with a segmenting program, for example retrieved from the storage 48, then the output may be a segmented structure, for example visually indicated on a suitable display means. Preferably, the output comprises a result of the associating of the multi-dimensional graphic objects with the geometric templates inter-related by the graphic relational application macro.

Figure 7:
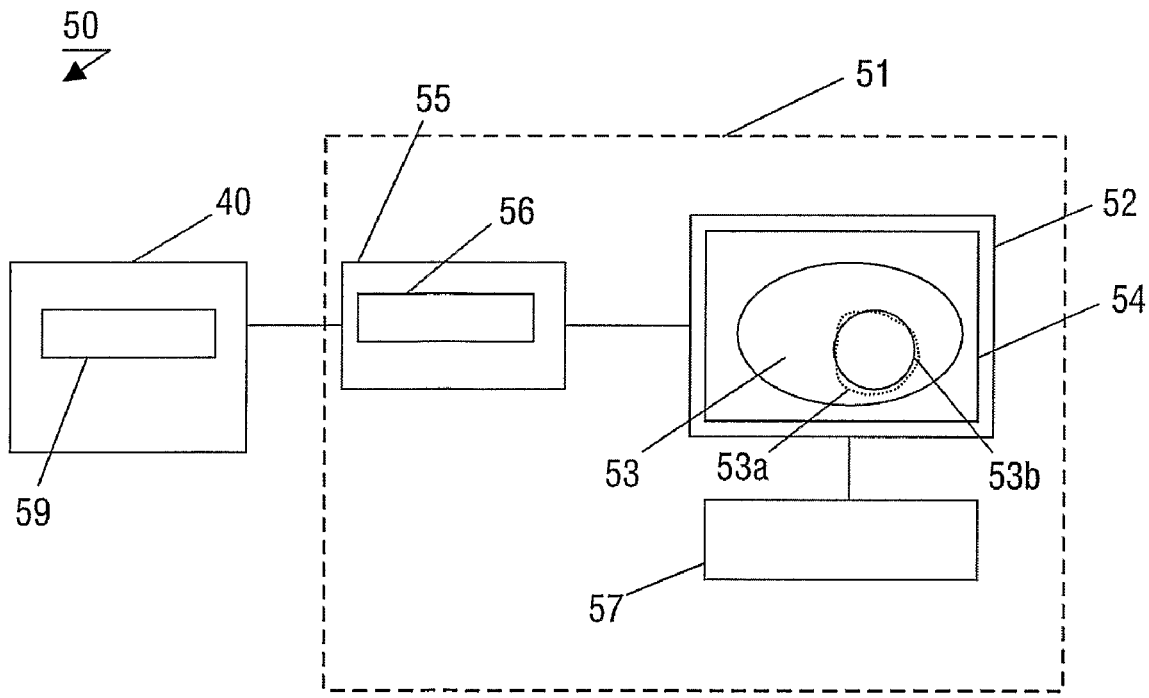
FIG. 7 shows in a schematic way an embodiment of an image analysis system according to the invention.

FIG. 7 shows in a schematic way an embodiment of an image analysis system according to the invention. The image analysis system 50 according to the invention comprises the apparatus 40 arranged for mapping the multi-dimensional dataset 59 using multi-dimensional geometric objects associated with geometric templates inter-related by means of the geometric relational application macro. The output of the apparatus 40 preferably comprises an image whereto multi-dimensional graphic objects associated with the geometric templates inter-related by the graphic relational application macro are mapped. The output of the apparatus 40 is made available to the input means 55 of an image viewer 51. Preferably, the input means 55 comprise a suitable processing means arranged to operate a suitable interface using a program 56 adapted to control the user interface 54 so that an image 53 comprising multi-dimensional geometric objects 53a associated with a geometric template 53b is visualized. Preferably, for user's convenience, the viewer 51 is provided with a high-resolution display means 52, the user interface being operable by means of a suitable user interface means 57, for example a mouse, a keyboard or any other suitable user's input device.

Figure 8:
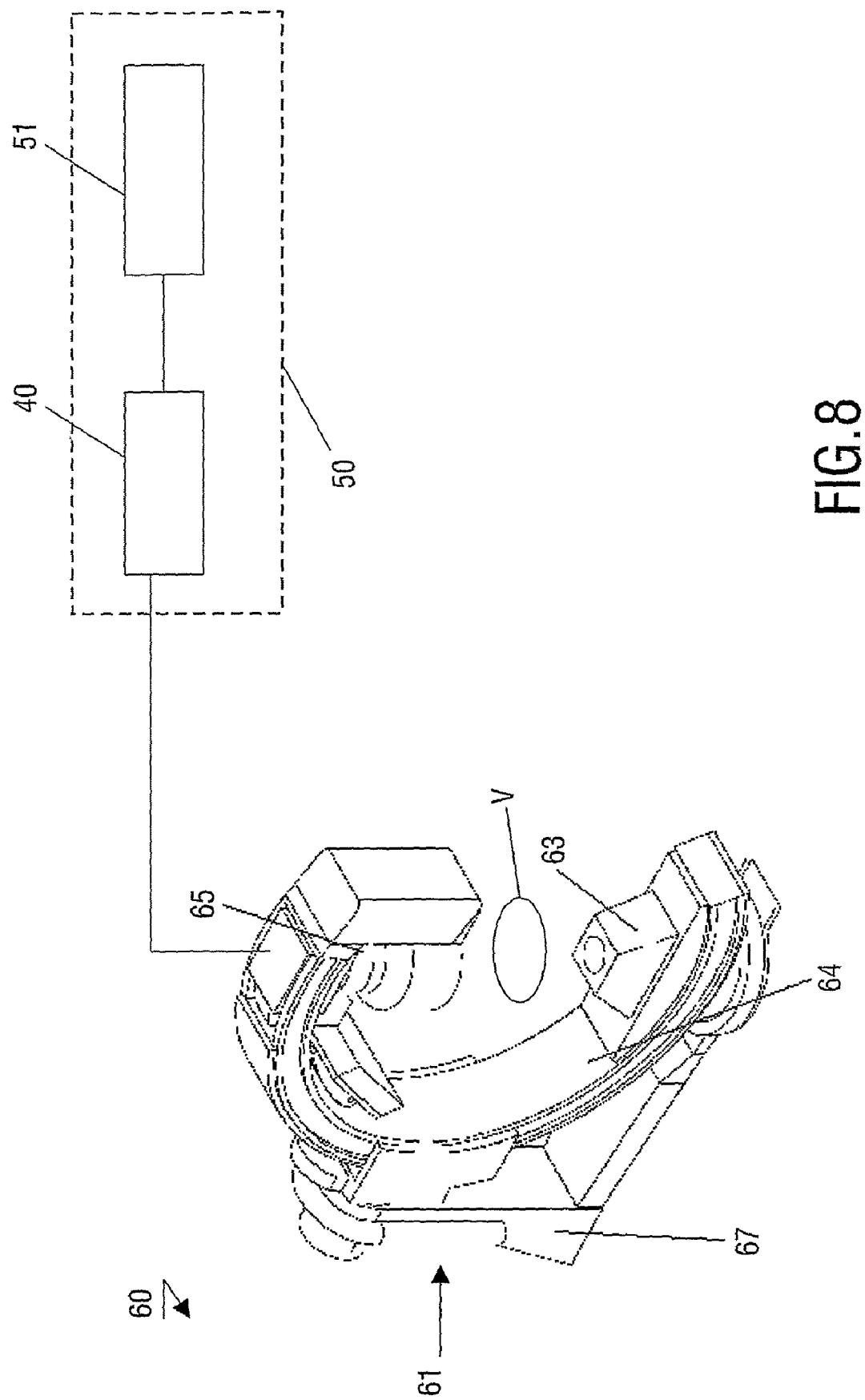
FIG. 8 shows in a schematic way an embodiment of an imaging system according to the invention.

FIG. 8 shows in a schematic way an embodiment of an imaging system according to the invention. The imaging system 60 comprises the image analysis system 50 communicatable to a data acquisition unit 61. However in this example an X-ray device is shown, other data acquisition modalities, like a CT, magnetic resonance apparatus or an ultra-sound device are contemplated as well. The X-ray apparatus is arranged to acquire image data from an object, for example a patient, positioned in an acquisition volume V of the apparatus 61. For this purpose a beam of X-rays (not shown) is emitted from the X-ray source 63. The transmitted radiation (not shown) is registered by a suitable detector (65). In order to enable an oblique imaging, the X-ray source 63 and the X-ray detector 65 are mounted on a gantry 64 which is rotatably connected to a stand 67.

The signal from the detector, comprising the multi-dimensional dataset is fed to suitable input means of the imaging system 50. Preferably, the multi-dimensional dataset is mapped using the multi-dimensional objects associated with geometric templates in the apparatus 40 operable by suitable computer program arranged to carry out said mapping. The resulting image is made available to the image analysis system 51, where the resulting image (not shown) is being visualized to the user using suitable display means (not shown).

The invention claimed is:

1. A method of object mapping in a multi-dimensional dataset, said method comprising using a processor to perform the steps of:
    segmenting the multi-dimensional dataset using multi-dimensional graphic objects;
    defining a set of geometric relations between a set of geometric templates using a geometrical relational application framework macro;

associating the multi-dimensional graphic objects with the geometric templates; and constructing, for the multi-dimensional graphic objects, constituent models, wherein a constituent model is designated for segmenting a respective predetermined constituent structure.

2. The method according to claim 1, wherein the method further comprises the step of:

correlating an update of a multi-dimensional graphic object with an update of the geometric template.

3. The method according to claim 1, wherein the geometric relational application framework macro is configured to define a constraint on an associated multi-dimensional graphic object.

4. The method according to claim 3, wherein for each multi-dimensional graphic objects the method further comprises the steps of:

constructing a composite model for segmenting the multi-dimensional graphic dataset by determining at least two constituent structures that are incorporated in or related to the multi-dimensional graphic object; and forming the composite model based on respective constituent models that correspond to the respective determined constituent structures, the composite model being operative to segment the multi-dimensional graphic dataset by controlling the constituent models.

5. The method according to claim 4, wherein an interface is selected for enabling a communication between the multi-dimensional graphic objects and the associated geometric template.

6. The method according to claim 1, further comprising visualizing on a viewing means the multi-dimensional graphic objects with the geometric template.

7. A non-transitory computer-readable medium containing instructions for causing a processor to perform a method of object mapping in a multidimensional dataset, the method comprising:

segmenting the multi-dimensional dataset using multi-dimensional graphic objects;

defining a set of geometric relations between a set of geometric templates using a geometrical relational application framework macro;

associating the multi-dimensional graphic objects with the geometric templates; and constructing, for the multi-dimensional graphic objects, constituent models, wherein a constituent model is designated for segmenting a respective predetermined constituent structure.

8. The non-transitory computer-readable medium according to claim 7, wherein the method further comprises the step of:

correlating an update of a multi-dimensional graphic object with an update of the geometric template.

9. The non-transitory computer-readable medium according to claim 7, wherein the geometric relational application framework macro is configured to define a constraint on an associated multi-dimensional graphic object.

10. The non-transitory computer-readable medium according to claim 9, wherein for each multi-dimensional graphic objects the method further comprises the steps of:

constructing a composite model for segmenting the multi-dimensional graphic dataset by determining at least two constituent structures that are incorporated in or related to the multi-dimensional graphic object; and forming the composite model based on respective constituent models that correspond to the respective determined constituent structures, the composite model being operative to segment the multi-dimensional graphic dataset by controlling the constituent models.

11. The non-transitory computer-readable medium according to claim 10, wherein an interface is selected for enabling a communication between the multi-dimensional graphic objects and the associated geometric template.

12. The non-transitory computer-readable medium according to claim 7, wherein the method further comprises visualizing on a viewing means the multi-dimensional graphic objects with the geometric template.

13. The non-transitory computer-readable medium according to claim 7, further comprising an imaging system including a data acquisition unit configured to acquire said multi-dimensional dataset.

14. An apparatus for enabling an object mapping in a multi-dimensional dataset, said apparatus comprising:

input means for loading the multi-dimensional dataset;

a processing means for segmenting said multi-dimensional dataset using multi-dimensional graphic objects;

a computation means configured to define a set of geometric relations between a set of geometric templates using a geometrical relational application framework macro; and means for associating the multi-dimensional graphic objects with the geometric templates, wherein means for associating is configured to construct constituent models for the multi-dimensional graphic objects, wherein a constituent model is designated for segmenting a respective predetermined constituent structure.

15. The An apparatus according to claim 14, wherein means for associating is further configured to:

construct a composite model for segmenting the multi-dimensional graphic dataset by determining at least two constituent structures that are incorporated in or related to the multi-dimensional graphic object; and form the composite model based on respective constituent models that correspond to the respective determined constituent structures, the composite model being operative to segment the multi-dimensional graphic dataset by controlling the constituent models.

16. The apparatus according to claim 15, further comprising an interface configured to enable a communication between the multi-dimensional graphic objects and the associated geometric template.

17. The apparatus according to claim 14, further comprising an image analysis system configured to visualize a mapped multi-dimensional dataset, said system comprising:

a viewing means configured to visualize the multi-dimensional graphic objects associated with a geometric template.

18. The apparatus according to claim 17, further comprising an imaging system including a data acquisition unit configured to acquire said multi-dimensional dataset.

19. The apparatus according to claim 14, wherein an update of a multi-dimensional graphic object is correlated with an update of the geometric template.

20. The apparatus according to claim 14, wherein the geometric relational application framework macro is configured to define a constraint on an associated multi-dimensional graphic object.

* * * * *